July 31, 1923.

R. N. EHRHART 1,463,158

SYSTEM FOR REMOVING AIR AND GASES FROM WATER

Filed June 5, 1920

Inventor
R. N. Ehrhart
By Bakewell, Byrnes & Parmelee
Attorney

Patented July 31, 1923.

1,463,158

UNITED STATES PATENT OFFICE.

RAYMOND N. EHRHART, OF PITTSBURGH, PENNSYLVANIA, ASSIGNOR TO ELLIOTT COMPANY, OF PITTSBURGH, PENNSYLVANIA, A CORPORATION OF PENNSYLVANIA.

SYSTEM FOR REMOVING AIR AND GASES FROM WATER.

Application filed June 5, 1920. Serial No. 386,834.

*To all whom it may concern:*

Figure 1:
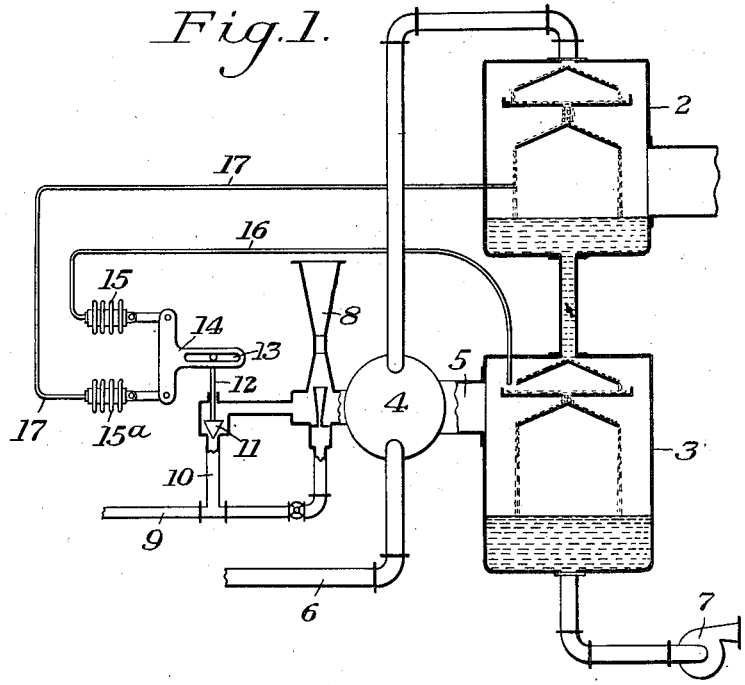
Figure 2:
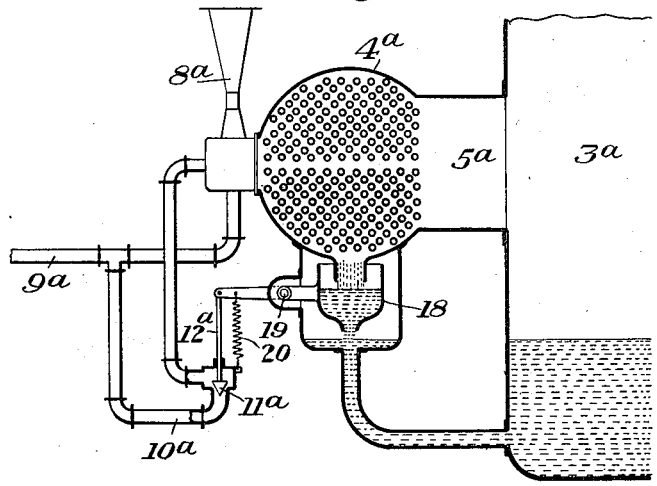

Be it known that I, RAYMOND N. EHRHART, a citizen of the United States, residing at Pittsburgh, Allegheny County, Pennsylvania, have invented a new and useful Improvement in Systems for Removing Air and Gases from Water, of which the following is a full, clear, and exact description, reference being had to the accompanying drawings, forming part of this specification, in which:

Figure 1 is a diagram showing partly in vertical section and partly in side elevation one form of apparatus for carrying out my invention, and Figure 2 is a similar view showing another form of my invention.

My invention has relation to the treatment of liquid for the removal of air and other gases therefrom, and more particularly to a method of treatment such as is described and claimed in the patent to William S. Elliott No. 1,321,999, dated November 18, 1919.

In the method described and claimed in said Patent No. 1,321,999, the liquid to be treated is heated and is then introduced into an evaporator in which there is maintained a pressure lower than the pressure corresponding to the temperature of the liquid immediately before it enters the evaporator. The vapors from the evaporator are passed through a condenser from which they are exhausted, and the liquid which forms the cooling medium of the condenser passes from thence into the heater.

In my application, Serial No. 386,833 of even date herewith, I have shown that in many cases it is desirable to regulate the condensation rate of the condenser used in connection with such apparatus; and that inasmuch as the amount of evaporation in the evaporator will depend upon the amount of condensation in the condenser, that by such regulation the amount of evaporation as well as the drop in temperature between the heater and the evaporator may be controlled within relatively narrow limits.

In that application I have disclosed certain means for controlling the operation of the condenser by controlling the amount of cooling liquid passing through the condenser.

I have further discovered that a similar result may be obtained by varying the capacity of the means used in exhausting the air and other condensible gases in the condenser. Thus, if the capacity of the air pump connected to the condenser and which exhausts the air and vapors from the evaporator through the condenser be depreciated, the condensation rate of the condenser will be diminished accordingly.

It is well known that any air pumped under given conditions has a certain volumetric capacity. If this pump is pumping a fluid, such as air, I can readily diminish its capacity for pumping air by introducing some other fluid into the suction of the pump. For example, if the pump has a capacity for handling a certain volume of air and steam, and other fluid than air be taken into the suction of the pump, a certain part of the capacity of the pump will be taken up in pumping such steam or other fluid, and its capacity for pumping air will, therefore, be diminished.

My invention provides a method and means whereby I take advantage of this fact for the effective regulation of the condenser and thereby of the evaporation in a system of the character described.

Referring first to that form of my invention shown in Figure 1, 2 designates a heater, 3 an evaporator, 4 a condenser which has an exhaust connection 5 with the evaporator, and 6 the liquid supply system which is connected with the heater 2 through the condenser. 7 designates a pump for withdrawing the treated liquid from the evaporator. These parts are all arranged substantially as in the said Patent No. 1,321,999.

8 designates means for exhausting the condenser 4 consisting, in the present instance, of a steam ejector of any well known type having a steam supply connection 9. The supply pipe 9 has a branch or bypass connection 10 leading into the suction chamber of the ejector, and provided with a controlling valve 11. The stem 12 of this valve is engaged with a slot 13 in one arm of a three-armed lever 14. Connected to each of the other arms of this lever is a thermostatic device 15 or 15a capable of expanding or contracting, the device 15 having a connection 16 with the evaporating chamber of the evaporator, while the device 15a has a similar connection 17 with the heating chamber of the heater 2.

It will be readily seen that so long as the action of the two thermostatic devices is substantially the same there will be no movement of the lever 14 or of the valve 11. If, however, the drop in temperature between the heating chamber and the evaporating chamber becomes excessive, which means that the amount of vaporization in the evaporator is also excessive, the lever 14 will be actuated by the thermostatic devices to open the valve 11 to a corresponding extent and thereby admit steam into the suction of the ejector. This diminishes the air pumping capacity of the ejector in the manner before described, which, in turn, reduces the capacity of the condenser. The evaporation in the evaporator is correspondingly decreased, and this controls the temperature drop between the heater and the evaporator. In other words, the valve 11 responds to any excessive drop in temperature between the heater and the evaporator, and which drop in temperature is a function of the amount of water evaporated which, in turn, is equivalent to the amount of water condensed; and acts to maintain the action of the system constant within relatively narrow limits.

"Rate of evaporation" as used throughout the specification and claims is definitive of the evaporation of a definite percentage of the total volume of liquid being treated irrespective of changes in that volume.

In that form of my invention shown in Figure 2, I utilize the varying amount of steam condensed in the condenser to effect a similar control of the valve which, in turn, controls the amount of steam admitted to the suction of the ejector.

18 designates a vessel which is arranged to receive the water of condensation from the condenser 4a and which is mounted upon one arm of a lever pivoted at 19 and having its other arm connected to the stem of the valve 11a.

20 is a spring also connected to the lever and having means whereby its tension may be varied. The vessel 18 is, as will be seen, responsive to the rate of flow of the condensate. If this flow becomes excessive, the level of the liquid in the vessel 18 increases, thereby moving the lever and valve to admit steam into the suction of the ejector 8a. The effect of this is to diminish the rate of condensation in the condenser.

Other parts shown in this figure and which are similar to corresponding parts in Figure 1, are given the same reference characters as those in Figure 1, with the letter "a" affixed thereto.

In the co-pending application of William S. Elliott, Serial No. 158,238, filed March 29th, 1917, there is disclosed and claimed a construction in which the percentage of the liquid evaporated is maintained substantially constant by the amount of heat supplied to the heater for the liquid.

In the co-pending application of William S. Elliott, Serial No. 538,944, filed February 24, 1922, there is disclosed a modified form of apparatus for accomplishing substantially the same purpose.

It will be understood that the two embodiments of my invention which I have herein shown and described are illustrative only and that various other improvements may be employed for varying the suction of the air exhausting pump to thereby give the desired control.

The specific form of my invention shown in Figure 2 forms the subject matter of my divisional application Serial No. 457,596 filed April 1, 1921.

I claim:

1. In the treatment of liquid for the removal of air and gases therefrom, the method which consists in evaporating a portion of the liquid to be treated, exhausting the vapors and gases from the evaporator through a condenser, and definitely varying the action of the exhausting means to thereby maintain the rate of evaporation substantially constant, substantially as described.

2. In the treatment of liquid for the removal of air and gases therefrom, the method which consists in evaporating a portion of the liquid to be treated, exhausting the vapors and gases from the evaporator through a condenser, and automatically varying within definite predetermined limits the action of the exhausting means to thereby maintain the rate of evaporation substantially constant, substantially as described.

3. In the treatment of liquid for the removal of air and gases therefrom, the method which consists in evaporating the liquid to be treated, exhausting the vapors and gases from the evaporator through a condenser, and utilizing changes in the evaporation in the evaporator to vary the action of the exhausting means to thereby maintain the rate of evaporation within the desired limits, substantially as described.

4. In apparatus of the character described, the combination of an evaporator, a condenser through which the vapors from the evaporator are conducted, an exhaust pump for the condenser, and means for introducing a fluid from a source other than the point of gas offtake on the condenser into the suction chamber of the exhaust pump in order to vary the capacity of said pump, substantially as described.

5. In apparatus of the character described, the combination of an evaporator, a condenser through which the vapors from the evaporator are conducted, an exhaust pump for the condenser, and means for automatically introducing a fluid from a source other than the point of gas offtake on the condenser into the suction chamber of the exhaust pump in order to vary the capacity of said pump, substantially as described.

6. In apparatus of the character described, the combination of an evaporator, a condenser through which the vapors from the evaporator are conducted, an exhaust pump for the condenser, and means for introducing a fluid other than that intended to be pumped into the suction chamber of the exhaust pump in order to vary the capacity of said pump, said means being dependent upon the evaporation in the evaporator, substantially as described.

7. In apparatus of the character described, the combination of an evaporator, a condenser, an exhaust pump for drawing the vapors and gases from the evaporator through the condenser, and means for automatically varying the capacity of said pump in accordance with the evaporation in the evaporator, substantially as described.

8. In apparatus of the character described, the combination of a heater, an evaporator having a supply connection with the heater, a condenser connected to the evaporator, an exhaust pump connected to the condenser, and means dependent on the difference in temperature between the heater and the evaporator for controlling the effective capacity of said pump, substantially as described.

9. In apparatus of the character described, the combination of a heater, an evaporator having a supply connection with the heater, a condenser connected to the evaporator, an exhaust pump connected to the condenser, and means actuated by a variation in temperature between the heater and the evaporator for admitting a fluid other than the fluid coming from the condenser into the suction chamber of the exhaust pump to thereby vary the capacity of said pump, substantially as described.

10. In the method of treating liquid for the removal of air and gases therefrom, the steps consisting in evaporating a small portion only of the liquid being treated, exhausting the vapors and gases released by the evaporation of said portion of the liquid and varying the action of the exhausting means to thereby maintain the desired rate of evaporation substantially constant.

11. In the method of treating liquid for the removal of air and gases therefrom, the steps consisting in evaporating a small portion only of the liquid being treated, exhausting the vapors and gases released by the evaporation of said portion of the liquid, and automatically varying the action of the exhausting means to thereby maintain the desired rate of evaporation substantially constant.

12. In the method of treating liquid for the removal of air and gases therefrom, the steps consisting in evaporating a small portion only of the liquid being treated, exhausting the vapors and gases released by the evaporation of said portion of the liquid, and varying the action of the exhausting means to vary the quantity of liquid being evaporated as the quantity of treated liquid varies to thereby maintain the desired rate of evaporation.

13. In the method of treating liquid for the removal of air and gases therefrom, the steps consisting in heating the liquid, passing the same to an evaporator, and maintaining conditions in the evaporator whereby the percentage rate of evaporation is substantially constant irrespective of the volume of liquid being treated.

14. In the method of treating liquid for the removal of air and gases therefrom, the steps consisting in heating the liquid, passing the same to an evaporator, and automatically maintaining conditions in the evaporator whereby the percentage rate of evaporation is substantially constant irrespective of the volume of liquid being treated, 15. In the method of treating liquid for the removal of air and gases therefrom, the steps consisting in heating the liquid, passing the same to an evaporator, withdrawing the released vapors and gases from the evaporator, and varying the action of the withdrawing means in accordance with pressure and corresponding temperature changes in the evaporator.

16. In the method of treating liquid for the removal of air and gases therefrom, the steps consisting in heating the liquid, passing the same to an evaporator, withdrawing the released vapors and gases from the evaporator, and automatically varying the action of the withdrawing means in accordance with pressure and corresponding temperature changes in the evaporator.

17. In the treatment of liquid for the removal of air and gases therefrom, the method which consists in evaporating a portion of the liquid, exhausting the vapors and gases produced by such evaporation and automatically positively producing variations in the action of the exhausting means.

18. In the treatment of liquid for the removal of air and gases therefrom, the method which consists in evaporating a portion of the liquid, exhausting the vapors and gases produced by such evaporation and automatically positively producing variations in the efficiency of the exhausting means.

In testimony whereof I have hereunto set my hand.

RAYMOND N. EHRHART.